ELECTRONIC SERVO-TYPE MULTIPLICATION AND DIVISION APPARATUS

Filed Aug. 14, 1967

2 Sheets-Sheet 1

May 5, 1970 KEISUKE TAKADA 3,510,639

ELECTRONIC SERVO-TYPE MULTIPLICATION AND DIVISION APPARATUS

Filed Aug. 14, 1967 2 Sheets-Sheet 2

United States Patent Office 3,510,639

Patented May 5, 1970

3,510,639

ELECTRONIC SERVO-TYPE MULTIPLICATION AND DIVISION APPARATUS

Keisuke Takada, Tokyo, Japan, assignor to Tokyo Shibaura Electric Co., Ltd., Kawasaki-shi, Japan, a corporation of Japan Filed Aug. 14, 1967, Ser. No. 660,510
Claims priority, application Japan, Aug. 18, 1966, 41/53,942; Oct. 8, 1966, 41/66,219; Oct. 15, 1966, 41/67,571
Int. Cl. G06g *7/16*
U.S. Cl. 235—195 8 Claims

ABSTRACT OF THE DISCLOSURE

A divisor signal which has the same frequency as an input signal and a multiplier signal having a frequency different from that input signal are coupled to a resistance network which comprises a fixed resistor in series with a variable resistance and a feedback signal having the same frequency as the input signal is derived out from another point of said network. The feedback signal and said input signal are compared by a comparator and an output difference signal is amplified by an amplifier. The amplified difference signal is coupled to the control element of said variable resistance element and the resistance value thereof is automatically regulated. A frequency selector selects an output signal having the same frequency on the multiplier signal from said network.

This invention relates to a servo-type multiplication and division apparatus.

Generally, in process computations, a controlled quantity of a process is detected by a detector, the detected quantity is multiplied or divided by various physical quantities to perform correction, conversion or transformation of the signal and the corrected or converted signal is then supplied to an indicator. Such an operating device is generally termed as the signal converter and includes an electric automatic balancing means.

In a typical known converter the converter includes a differential amplifier which energizes a servo-motor. An input signal from a detector is amplified to a suitable magnitude by means of a pre-amplifier and is applied to one input of the differential amplifier. The sliders of a pair of potentiometers are ganged together, the slider of one potentiometer being connected to the other input of the differential amplifier. The signal at the slider of the second potentiometer is the output signal and is equal to the input signal divided by the potential across the second potentiometer and divided by the potential across the first potentiometer. It is also well known in the art to use a differential transformer in lieu of the servo-motor. In this alternative arrangement the output of a differential amplifier is utilized to energize a control winding of a differential transformer to mechanically move a magnetic core to change the signal that is transmitted to the secondary winding from the primary winding of the differential transformer so as to balance the input signal and the feedback signal.

However, as these converting means employing servomotors or differential transformers are required to use mechanical elements they are not satisfactory because of their short life and wear of mechanical elements. In addition, vibrations affect the results.

In order to solve these problems a converter has been proposed which utilizes a semiconductor Hall element producing Hall electromotive forces, wherein the output from an output amplifier is used to supply electric current to a Hall element, a quantity to be operated is supplied to the Hall element as a magnetic field and the electromotive force of the Hall element, serving as a feedback signal, is differentially supplied to the input of the output amplifier together with an input signal. Although such a converter means does not require any mechanical element it is also unsatisfactory because the error caused by temperature drift is excessive since the Hall constant of the Hall element itself varies greatly with temperature variation.

Various other converter means have also been proposed utilizing non-mechanical variable resistors whose resistance values are varied by means of foreign factors such as light, heat, magnetic field, voltage or the like. In a typical one of these arrangements, a voltage corresponding to the quantity to be operated on is applied to both of two variable resistors of the same design, one of resistors being utilized in a known type of automatic balancing circuit which produces a feedback signal that balances against the input signal while the other resistor is utilized to obtain the output signal. Thus, this system requires two variable resistors having the same characteristics. However, as it is extremely difficult to provide resistors having the same characteristics, it is difficult to provide satisfactory accuracy.

Accordingly, it is an object of this invention to provide a novel electronic servo-type converter means which utilizes resistance networks, which does not require any mechanical elements and which is substantially free from temperature drift and other undesirable effects.

Another object of this invention is to provide a novel electronic servo-type multiplication and division apparatus which can perform independently, but simultaneously, a plurality of operations by means of a single non-mechanical variable resistance element.

According to one aspect of this invention there is provided an electronic servo-type multiplication and division apparatus comprising a resistance network including a series circuit of a fixed resistance element and a variable resistance element the resistance value of which is dependent on a non-mechanical signal applied to it, said series circuit having one end connected to a source of reference potential, means to supply to the other end of said series circuit a divisor signal and at least one multiplier signal, each signal having a different frequency, means to derive signal components from the junction between said fixed resistance element and said variable resistance element through bandpass filters said signal components having frequencies equal to those of said divisor signal and said multiplier signal or signals repectively, mean to compare said signal component corresponding in frequency to said divisor signal and an input signal, and to control the resistance value of said variable resistance element such that the value of the difference between said signal component corresponding to said divisor signal and said input signal becomes zero, so that the or a signal component corresponding in frequency to the or a multiplier signal represents a value obtained by dividing an input variable represented by said input signal, by a variable represented by said divisor signal and by multiplying the quotient by a variable represented by the or a multiplier signal.

In this invention the non-mechanical variable resistance element may take the form of a single resistance element which utilizes such quantities as light, heat, magnetic field, voltage and the like as the resistance varying parameter. For example, CdS cells, phototransistors and the like may be used as elements that vary their resistance values in response to light. Thermistors and the like may be used as a variable resistance element which is responsive to heat. Magneto-resistance and the like may be used as resistance elements responsive to varying magnetic field. Voltage responsive elements may include field effect transistors and the like.

According to another aspect of this invention there is provided an electronic servo-type multiplication and division apparatus comprising a resistance network including a bridge circuit formed of two arms at one side and two arms at the other side, said two arms at one side forming a first series circuit including a fixed resistance element and a variable resistance element the resistance value of which is dependent on a non-mechanical signal applied to it, the variable resistance element having one end connected to a source of reference potential, said two arms at the other side forming a second series circuit of a plurality of resistors, means to supply to a junction between said first and second series circuits a divisor signal and at least one multiplier signal, the divisor signal and the multiplier signal or signals having different frequencies, means to supply an input signal to a part of said second series circuit, means to derive signal components between the output terminals which are constituted by the junctions of said two arms of said first series circuit and of said second series circuit, said signal components having frequencies equal to those of said divisor signal and the multiplier signal or signals respectively, means to compare the signal component, which is obtained from the output terminals and which corresponds in frequency with said divisor signal, and said input signal and to control the resistance value of said variable resistance element such that the value of the difference between the signal component which corresponds with said divisor signal and said input signal becomes zero, so that the or a signal component corresponding to the or a multiplier signal represents a value obtained by dividing an input variable represented by said input signal, by a variable represented by said divisor signal and by multiplying the quotient by the or a variable represented by the or a multiplier signal.

Further features and advantages of the present invention will become apparent and this invention will be better understood from the following description, reference being made to the accompanying drawings, in which.

Figures 1, 2:
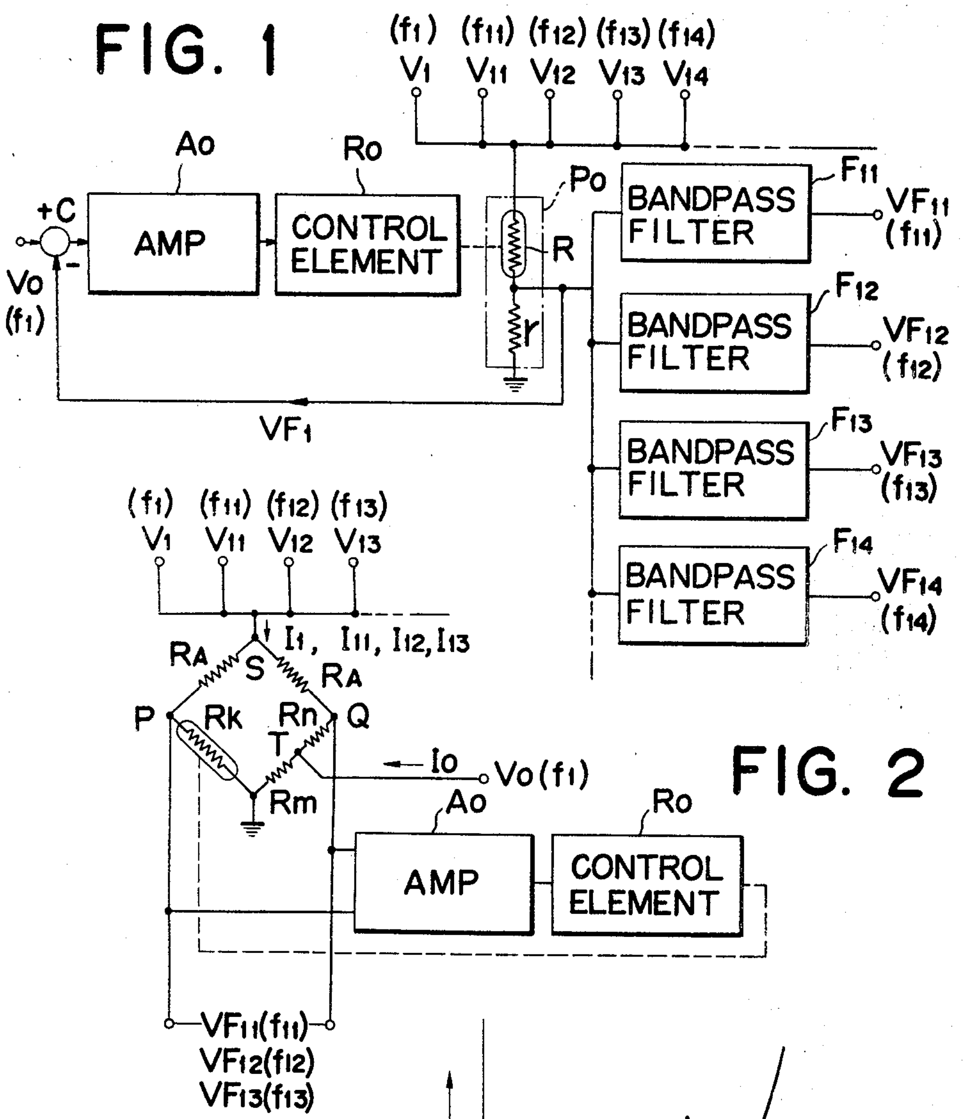
FIG. 1 shows a block diagram of a typical embodiment of this invention.
FIG. 2 is a block diagram of a modified embodiment of this invention.

Referring now to the accompanying drawings, FIG. 1 shows the simplest circuit for performing operations on a divisor signal $V_1$, an input signal $V_0$ and a plurality of multiplier signals $V_{11}$, $V_{12}$, $V_{13}$, $V_{14}$ . . . . A variable resistance element R and a fixed resistor $r$ are connected in series to form a potentiometer $P_0$. One terminal of the fixed resistor $r$ of this potentiometer is grounded and said signals $V_1(f_1)$, $V_{11}(f_{11})$, $V_{12}(f_{12})$, $V_{13}(f_{13})$, $V_{14}(f_{14})$ . . . are supplied to one terminal of the variable resistance element R. Symbols $f_1$, $f_{11}$, $f_{12}$, $f_{13}$, $f_{14}$ . . . of these signals mean that they have different frequencies. A fractional output $VF_1$ of a signal $V_1(f_1)$ obtainable from the output terminal of the potentiometer $P_0$ or the common junction between the variable resistance element R and the fixed resistor $r$ is utilized as a feedback signal, all other frequency components (i.e., $VF_{13}$) being eliminated by a filter (not shown) in the feedback line. The signal $VF_1$ is compared with an input $V_0(f_1)$ by a comparator C, the difference between them being supplied to a servo-amplifier $A_0$. After being sufficiently amplified by the amplifier $A_0$, the difference signal is then applied to a control element $R_0$ of the variable resistor element R. Inasmuch as the control element $R_0$ automatically regulates the resistance value of the variable resistance element R so as to restore to zero the difference signal, the following relation holds in the equilibrium condition.

$$V_0=VF_1 \tag{1}$$

Assuming now that the voltage division of the potentiometer at this time is represented by G, then with respect to frequency $f_1$ $$VF_1=GV_1 \tag{2}$$

From Equations 1 and 2 we obtain $$G=V_0/V_1 \tag{3}$$

As can be noted from the Equation 3, in the equilibrium state of the servo-mechanism the ratio of voltage division G shows the result of division of the input signal $V_0$ (the dividend) divided by the signal $V_1$ (the divisor). Since other signals $V_{11}$, $V_{12}$, $V_{13}$, $V_{14}$ . . . to be operated on have different frequencies, they could be derived from the output terminal of the potentiometer $P_0$ without adversely affecting the servo-mechanism. Thus, respective outputs that can be otained at the output terminal in the equilibrium condition can be show by the following equations.

$$\begin{aligned} VF_{11}&=GV_{11}=V_0V_{11}/V_1\\ VF_{12}&=GV_{12}=V_0V_{12}/V_1\\ VF_{13}&=GV_{13}=V_0V_{13}/V_1\\ VF_{14}&=GV_{14}=V_0V_{14}/V_1 \end{aligned} \tag{4}$$

These output signals can be taken out (or derived) independently without introducing any interference by connecting a plurality of bandpass filters $F_{11}$, $F_{12}$, $F_{13}$, $F_{14}$ . . . on the output side of the potentiometer $P_0$.

Thus, it will be seen that with the electronic servo type multiplication and division apparatus shown in FIG. 1, a plurality of operations can be performed simultaneously by means of a servo-computer utilizing a single non-mechanical variable resistance element.

FIG. 2 shows a modified embodiment of this invention wherein a bridge circuit is employed as the resistance network including a variable resistance element. Four arms of the bridge circuit are comprised respectively by resistors $R_A$, $R_A$, a series circuit consisting of resistors $Rn$ and $Rm$ and a variable resistance element $Rk$. The junction T between resistors $Rn$ and $Rm$ is employed as the input terminal for the input signal $V_0(f_1)$ and to the junctions between resistors $R_A$ and $R_A$ are supplied signals, such as a divisor signal $V_1(f_1)$ and multiplier signals $V_{11}(f_{11})$, $V_{12}(f_{12})$, $V_{13}(f_{13})$ . . . which have different frequencies $f_{11}$, $f_{12}$, $f_{13}$ . . . . The junction between resistor $Rm$ and variable resistance element $Rk$ is grounded whereas the junction P between the resistor $R_A$ and the variable resistance element $Rk$ and the junction Q between resistors $R_A$ and $Rn$ are utilized as output terminals. Output terminals P and Q are connected to the input terminals of a servo-amplifier $A_0$ and the output therefrom is supplied to a control element $R_0$ which controls the variable resistance element $Rk$.

At first, the condition of equilibrium of the bridge circuit for an input signal $V_0$ of frequency $f_1$ and a divisor signal $V_1(f_1)$ will be considered. A current $I_0$ produced by the input signal $V_0$ flows into a point T on the bridge circuit, one portion thereof flowing to ground through the resistor $Rm$ and the remaining portion flowing to ground through resistor $Rn$, resistors $R_A$ and $R_A$ and the variable resistor $Rk$. On the other hand the current $I_1$ produced by the divisor signal $V_1(f_1)$ will flow into a point S on the bridge, one portion thereof then flowing to the ground through resistors $R_A$, $Rn$ and $Rm$ while the remaining portion flows to the ground through the resistor $R_A$ and the variable resistor $Rk$. The flow of these currents $I_0$ and $I_1$ through the bridge circuit will produce an output $V_{PQ}f_1$ across the output terminals which is expressed by the following equation.

$$V_{PQ}f_1 = G_A I_1 + G_B I_0 \quad (5)$$

where $$G_A = \frac{R_A(Rn + Rm - rk)}{2R_A + Rn + Rm + R_k}$$

$$G_B = \frac{2R_A Rm}{2R_A + Rn + Rm + R_k} \quad (6)$$

The unbalanced output $V_{PQ}f_1$ is amplified by the amplifier $A_0$ and is then applied to the resistance control element $R_0$ which functions to automatically vary the value of the variable resistance element $Rk$ so that the output $V_{PQ}f_1$ is always brought to zero. Thus, as the unbalanced output $V_{PQ}f_1$ is always controlled to become zero, the following equation is obtained.

$$G_A I_1 + G_B I_0 = 0 \quad (7)$$

Hence $$\frac{G_A}{G_B} = -\frac{I_0}{I_1} \quad (8)$$

This means that the ratio $G_A/G_B$ is determined by the ratio between currents $I_0$ and $I_1$.

It is now assumed that values of various resistors comprising respective arms of the bridge circuit are selected to satisfy the following relation.

$$\frac{2R_A + Rn + Rm}{Rk} \gg 1 \quad (9)$$

Then $G_B$ will be constant regardless of the variation in the value of the resistor $Rk$.

On the other hand, to the point S of said bridge circuit are applied a plurality of currents $I_{11}$, $I_{12}$, $I_{13}$ . . . of different frequencies which are proportional to the multiplier signals $V_{11}$, $V_{12}$, $V_{13}$ . . . . As mentioned above each of these currents is divided into two portions at point S thus respectively creating output signals $VF_{11}(f_{11})$, $VF_{12}(f_{12})$, $VF_{13}(f_{13})$ . . . of different frequencies across output terminals P and Q. Each of the ouput signals is represented by the following equations.

$$VF_{11} = G_A I_{11} = -G_B \frac{I_0 I_{11}}{I_1}$$

$$VF_{12} = G_A I_{12} = -G_B \frac{I_0 I_{12}}{I_1}$$

$$VF_{13} = G_A I_{13} = -G_B \frac{I_0 I_{13}}{I_1} \quad (10)$$

As above mentioned, since the symbol $G_B$ in Equation 10 can be deemed as a constant it will be understood that similar operations can be performed in this embodiment as those described in connection with the embodiment shown in FIG. 1, and that again output signals appearing across output terminals P and Q can be segregated without any mutual interference by utilizing a suitable frequency selecting device.

Figures 3, 5:
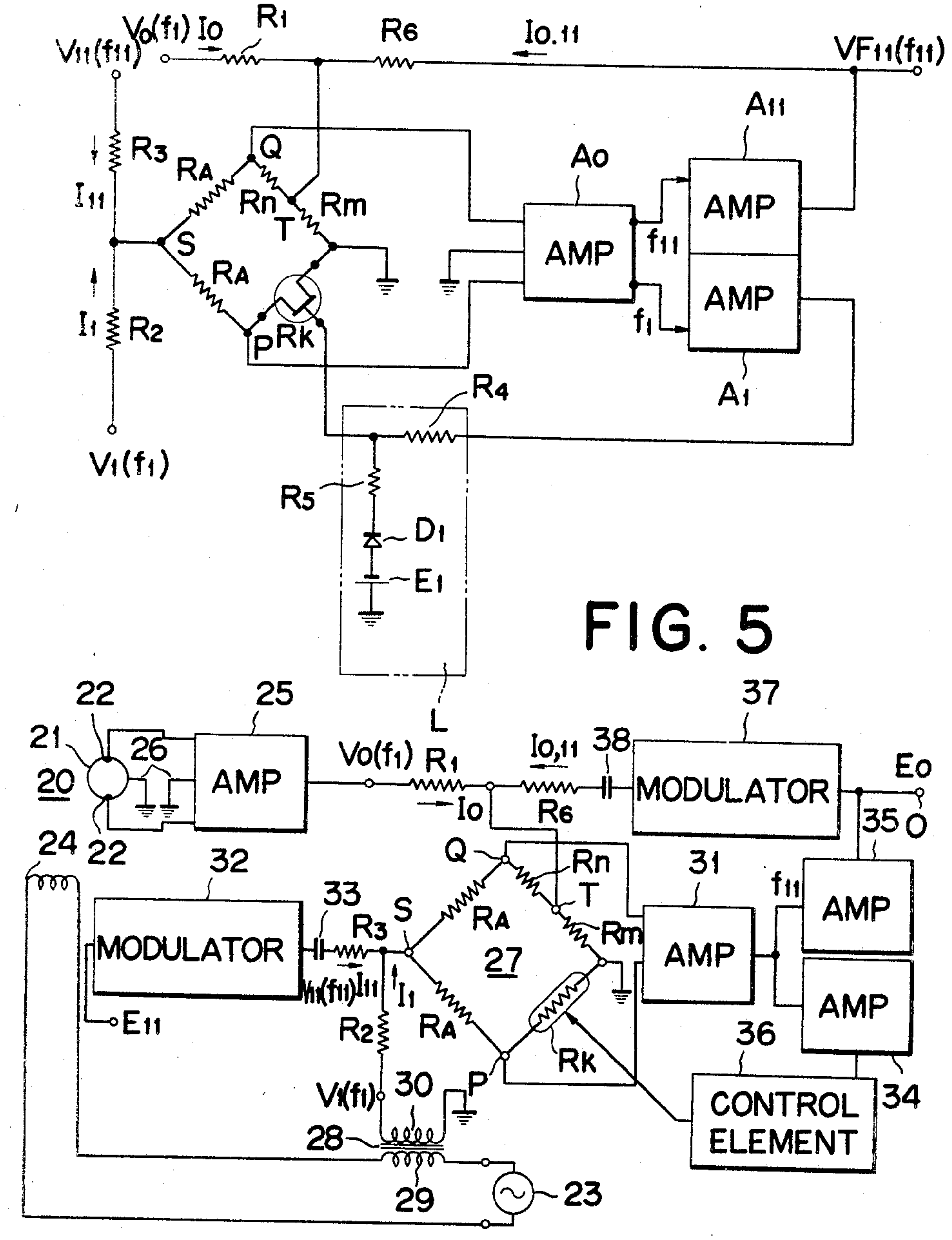
FIG. 3 is a block diagram corresponding to the embodiment shown in FIG. 2, wherein a field effect transistor is utilized as the variable resistance element.
FIG. 5 is a block diagram of one embodiment of this invention utilizing the novel electronic servo-type converter device as the converter device for an electromagnetic flow meter.

FIG. 3 shows a still further modification of this invention which utilizes a bridge circuit as the resistance network, and a field effect transistor as the variable resistance element. In the same manner as the previous embodiment, a current $I_1$ proportional to a divisor signal $V_1(f_1)$ and a current $I_{11}$ proportional to a multiplier signal $V_{11}(f_{11})$ flow to a point S on the bridge circuit through resistors $R_2$ and $R_3$ respectively. Further a current $I_0$ proportional to an input signal $V_0(f_1)$ flows into a point T of the circuit through a bridge resistor $R_1$. The unbalance voltage of the bridge circuit is derived from between the output terminals and applied to an amplifier $A_0$. An output signal having a frequency $f_1$ is segregated from the output of the amplifier $A_0$ by means of a suitable means and is further amplified by an amplifier $A_1$, the output thereof being coupled to a gate electrode of a field effect transistor corresponding to said variable resistance element $Rk$ through a resistor $R_4$.

The source electrode of the field effect transistor $Rk$ is grounded and its drain electrode is connected to a point P so that the resistance between the source electrode and the drain electrode will be varied in accordance with the unbalanced output of frequency $f_1$ which is impressed across the gate and source electrodes thereof. The resistance value of the field effect transistor $Rk$ is automatically controlled in accordance with the output from the amplifier $A_1$ such that the unbalanced output at the output terminals of the bridge circuits is brought to zero by the output of the amplifier $A_1$. Accordingly the above Equation 8 holds again.

The output appearing across output terminals P and Q of the bridge circuit owing to a current $I_{11}$ proportional to a multiplier signal $V_{11}(f_{11})$ is again amplified by an amplifier $A_0$ and after frequency segregation by means not shown is amplified by an amplifier $A_{11}$ which provides an output $VF_{11}(f_{11})$. This output $VF_{11}$ causes a feedback current $I_{011}$ to flow into the point T of the bridge circuit through a resistor $R_6$. The feedback current is proportional to the multiplier current and will be regulated so that the unbalanced output of a frequency $f_{11}$ of the bridge circuit in the balanced condition will be brought to zero automatically. Thus, by the action of amplifiers $A_0$ and $A_{11}$, an output $VF_{11}$ will be obtained which will cause currents $I_{11}$ and $I_{011}$ to balance each other in the bridge circuit. As a consequence, in the balanced condition of the signal at a frequency $f_{11}$, the following relation holds $$G_A I + G_B I_{011} = 0 \quad (11)$$

Thus, where the output signal $VF_{11}$ is fed back, the particular circuit condition as represented by Equation 9 is not necessary. Stated another way, as can be clearly noted from Equations 8 and 11, the output current $I_{011}$ is given by the following equation.

$$I_{011} = \frac{I_0 \cdot I_{11}}{I_1} \quad (12)$$

This means that the output signal $VF_{11}$ represents the results of a multiplication and division as follows:

$$VF_{11} = \frac{V_0 \cdot V_{11}}{V_1} \quad (13)$$

Figure 4:
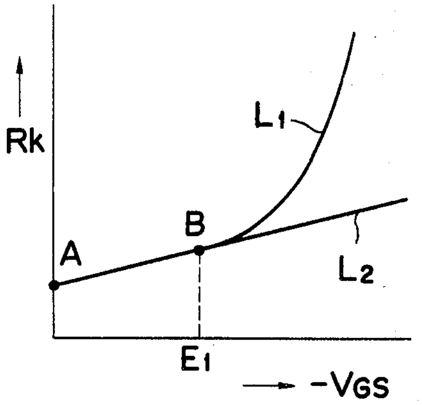
FIG. 4 shows a typical characteristic of a field effect transistor.

Generally, where a semiconductor element such as a said field effect transistor is utilized as the variable resistance element, its non-linear resistance characteristic would affect the balancing sensitivity of the bridge circuit. FIG. 4 shows the relation between the control voltage $V_{GS}$ impressed between a gate electrode and a source electrode of a field effect transistor and the resistance value $Rk$ between its source electrode and drain electrode. As shown by the characteristic curve $L_1$ of this figure the resistance value varies non-linearly with the magnitude of the control voltage (or the unbalanced voltage). This means that the sensitivity of the bridge circuit is greatly influenced by the magnitude of the unbalanced output from the bridge circuit. However, if the control voltage were limited so that a relatively straight portion of the curve $L_1$ is used in order to always obtain a constant sensitivity, the range of operation would be greatly reduced.

In the above embodiment, in order to broaden the range of operation and to assure the constant bridge sensitivity within said range, the junction between the resistor $R_4$ and the gate electrode of the field effect transistor $Rk$ is grounded through the serially connected combination of resistor $R_5$, a diode $D_1$ poled as shown and a source of DC potential E. This series circuit functions as a limiter L for the outputs of amplifier $A_1$ and the DC source $E_1$ is adjusted to provide a voltage equal to the voltage between the gate electrode and the source electrode at a point B on the characteristic curve $L_1$ at which the curve begins to curve, thus negatively biasing the anode electrode of diode $D_1$. So long as the unbalanced output from the amplifier $A_1$ or the negative voltage applied across the gate and source electrodes of the field effect transistor $Rk$ is smaller than the negative voltage of the DC source $E_1$, the diode $D_1$ will be reverse biased and hence is non-conductive. Thus all of the control currents are applied to the gate electrode of the field effect transistor. However, when the above described relation is reversed the diode $D_1$ will become conductive to by-pass the control current through resistor $R_5$. In this manner, as the output from the amplifier $A_1$ is shared between resistors $R_4$ and $R_5$ it is possible to limit the control input to the field effect transistor. By suitably adjusting the voltage share between resistors $R_4$ and $R_5$ it becomes possible to linearly vary the internal resistance of the field effect transistor over a wide range as shown by a straight line $L_2$ in FIG. 4, thus always maintaining constant the sensitivity of the bridge circuit.

While in the above embodiment a single limiter L has been employed, generally, a more accurate compensation device may be employed which includes a polygonal line function generator including a plurality of parallel connected limiters. The voltage of the DC source $E_1$ is selected to be suitable for the characteristics of various field effect transistors. It will be readily understood that even when various other non-linear resistance elements, such as a photoconductor element, are used it may similarly be possible to compensate the sensitivity of the bridge circuit by limiting the control input to the non-linear resistance element in the same manner as above described.

FIG. 5 shows an embodiment of this invention wherein the electronic servo-type multiplication and division apparatus is employed as a converting apparatus of an electromagnetic flow meter. As is well known in the art, the signal transmitter 20 of an electromagnetic flow meter comprises a conduit 21 adapted to pass a fluid, a pair of diametrically opposed electrodes 22 extending through the wall of the conduit and an exciting winding 24 energized by a source of electric power 23. A pair of electrodes 22 are connected to the input of a pre-amplifier 25 which may be a push-pull amplifier. The conduit 21 and the neutral point of the pre-amplifier are grounded as shown by grounded conductors 26.

The output voltage from the signal transmitter 20 of the electromagnetic flow meter is proportional to the product of flow velocity $v$ of the fluid flowing through the conduit 21 and the magnetic flux $\Phi$ produced by the exciting winding 24. Thus, the output voltage $V_0(f_1)$ can be represented by $$V_0(f_1)=k_1\cdot v\cdot\Phi \qquad (14)$$

where $k_1$ denotes a proportional constant.

As this equation shows, since the output from the signal transmitter is proportional to the flux $\Phi$, any fluctuation thereof caused by the fluctuation of the voltage of the source 23 may cause an error in the flow meter.

The electronic servo-type operational circuit is very effective to compensate for the fluctuation of the source voltage. Current $I_0$ produced by the output voltage $V_0(f_1)$ from the signal transmitter is applied to an input terminal T of a bridge circuit 27 via a resistor $R_1$. An exciting current is passed through a primary winding 29 of a transformer 28 to obtain a divisor signal $V_1(f_1)$ from a secondary winding 30 which is proportional to the exciting current whereby a current $I_1$ proportional to the divisor signal is supplied to a point S of the bridge circuit via a resistor $R_2$.

On the other hand, a multiplier signal of a constant value or a signal $E_{11}$ corresponding to the density, temperature or other parameter of the fluid flowing in conduit 21 is modulated by a modulator 32 to have a frequency $f_{11}$ different from that $f_1$ of exciting source to supply a current $I_{11}$ proportional to this modified output $V_{11}(f_1)$ to the point S of the bridge circuit 27 through a condenser 33 and a resistor $R_3$.

The output of the bridge circuit 27 (taken at points P and Q) is amplified by an amplifier 31 and is then subjected to frequency selection amplification effected by amplifiers 34 and 35. An output of a frequency $f_1$ controls the resistance value of the variable resistance element $Rk$ through a control element 36 so as to balance the bridge circuit. The amplified output signal at frequency $f_{11}$ is rectified in amplifier 35 and appears at output terminal O as a DC output voltage which is modulated by a modulator 37 to have a frequency $f_{11}$. The modulated output is then fed back to a point T of the bridge circuit via a condenser 38 and a resistor $R_6$. Where such a converter is utilized the output $E_0$ appearing at the output terminal O may be expressed by the following equation using the identical consideration as in the case of Equation 13.

$$E_0=\frac{V_0\cdot E_{11}}{V_1} \qquad (15)$$

Since the divisor signal $V_1$ of this equation is proportional to the exciting current energizing the exciting winding 24 and since magnetic flux $\Phi$ represented by Equation 14 is proportional to the exciting current, it will be clearly noted that the effect caused by the variation in the exciting current is perfectly compensated for as shown by Equation 15.

Equation 15 can be rewritten as $$E_0=kv\cdot E_{11} \qquad (16)$$

where $k$ represents a proportional constant.

Equation 16 shows that the output of the converter is proportional to the flow rate alone provided that $E_{11}$ is assumed constant. If it were assumed that $E_{11}$ represents a signal proportional to the temperature of the fluid output, $E_0$ would indicate the temperature compensated flow velocity of the fluid or a value representing the flow quantity (or rate) at a definite temperature. Further, if the signal $E_{11}$ represents a signal which varies in response to the density of the fluid, $E_0$ would represent a product of the flow quantity and the density. Such a plurality of compensating operations may be performed simultaneously by supplying to the point S of the bridge circuit a plurality of compensating signals of different frequencies and by feeding back to point T of the bridge circuit corresponding feedback signals.

It will be understood that this invention can be used instead of known automatic balancing mechanisms which include mechanical drives for effecting conversion, compensation, etc. of signals.

What is claimed is:

1. An electronic servo-type multiplication and division apparatus comprising:

a source of reference potential;

a resistance network including a series circuit of a fixed resistance element and a variable resistance element, the resistance value of said variable element being dependent on a non-mechanical signal applied to it, one end of said series circuit being connected to said source of reference potential;

means to supply to the other end of said series circuit a divisor signal and at least one multiplier signal, each signal having a different frequency;

filter means coupled to the junction of said fixed resistance element and said variable resistance element to derive signal components having frequencies equal to those of said divisor signal and of said at least one multiplier signal; and means to compare said derived signal component corresponding in frequency to said divisor signal and an input signal, and to control the resistance value of said variable resistance element such that the value of the difference between said derived signal component corresponding in frequency to said divisor signal and said input signal becomes zero, the derived signal representing a value which is obtained by dividing an input variable represented by said input signal, by a variable represented by said divisor signal and by multiplying the quotient by at least one variable represented by said at least one multiplier signal.

2. An electronic servo-type multiplication and division apparatus comprising:

a source of reference potential;

a resistance network including a bridge circuit formed of two arms at one side and two arms at the other side, said two arms at one side forming a first series circuit including a fixed resistance element and a variable resistance element the resistance value of which is dependent on a non-mechanical signal applied to it, the variable resistance element having one end connected to said source of reference potential, said two arms at the other side forming a second series circuit of a plurality of resistors;

means coupled to a junction between said first and second series circuits to supply a divisor signal and at least one multiplier signal, the divisor signal and said at least one multiplier signal having different frequencies;

means to supply an input signal to a part of said second series circuit;

means to derive signal components between a pair of output terminals, one output terminal being coupled to the junction of said two arms of said first series circuit and the other output terminal being coupled to the junction of said two arms of said second series circuit, said derived signal components having respective frequencies equal to those of said divisor signal and of said at least one multiplier signal; and means to compare the signal component which is obtained from said output terminals and which corresponds in frequency with said divisor signal, and said input signal and to control the resistance value of said variable resistance element such that the value of the difference between the signal component which corresponds with said divisor signal and said input signal becomes zero, the signal component corresponding in frequency to said at least one multiplier signal representing a value which is obtained by dividing an input variable represented by said input signal, by a variable represented by said divisor signal and by multiplying the quotient by at least one variable represented by said at least one multiplier signal.

3. Apparatus according to claim 2 further comprising means to feed back a signal component from said output terminals of said bridge circuit to simultaneously add it to said input signal.

4. Apparatus according to claim 2 wherein said means to control the resistance value of said variable resistance element includes a circuit for limiting the value of a control signal applied to said variable resistance element, thus compensating for non-linearity of the variable resistance element.

5. Apparatus according to claim 4, wherein said variable resistance element comprises a field effect transistor and wherein said control circuit means includes at least one piecewise linear function generating circuit coupled to said transistor, said function generating circuit including a DC source coupled to a diode and a resistor, the output of said function generating circuit being coupled to a control input terminal of said field effect transistor to compensate for the nonlinearity thereof.

6. Apparatus according to claim 2 wherein said at least one multiplier signal includes a plurality of multiplier singals, each having a different frequency, further comprising:

amplifying means coupled to amplify together the unbalanced outputs from said bridge circuit which are caused by said plurality of multiplier signals of different frequencies; and filter circuits to segregate output signals of different frequencies to prevent interference therebetween.

7. An electronic servo-type multiplication and division apparatus for use as the converting apparatus of an electromagnetic flow meter having a magnetic generating device to generate a magnetic field which alternates transversely to the direction of flow of a fluid and a pair of diametrically opposed electrodes provided on a line transverse to the plane of said magnetic field, wherein a potential difference dependent on the flow rate appears between the electrodes, the converting apparatus comprising a bridge circuit network including a variable resistance element coupled in one arm thereof and fixed resistance elements in the other arms, the value of the variable resistance being dependent on a non-mechanical signal applied to it in one arm;

means to supply to a first input terminal of said bridge circuit network a signal ($V_0$) from the electrodes of the flow meter representing the flow rate;

means to supply to another input terminal of said bridge circuit network a divisor signal ($V_1$) having the same frequency as the exciting current of the flow meter and proportional in magnitude to that of the exciting current;

means to supply to said another terminal of said bridge circuit network a multiplier signal ($E_{11}$) which acts as a reference signal and which has a frequency which differs from that of the exciting current;

means to detect a component of the output signal ($E_0$) which is representative of the flow rate which is represented by the equation of $$E_0 = \frac{E_{11} \cdot V_0}{V_1}$$

which is obtained from an output terminal of said bridge circuit network and which has the frequency of said multiplier signal;

means to feed back said component of the output signal at the frequency of the multiplier signal to said first input terminal of said bridge circuit network; and means to control the resistance value of said variable resistance element by feeding back the component of the output signal having the same frequency as the exciting current frequency so as to maintain a balance condition in said bridge circuit network.

8. Apparatus according to claim 7 wherein said variable resistance element comprises a field effect transistor, and said control element includes a series circuit consisting of a DC source, one terminal of which is grounded, a diode series coupled with said DC source and a resistor, one end of which is connected to said diode and the other of which is connected to a gate terminal of said field effect transistor.

References Cited

UNITED STATES PATENTS

| | | | |
|---|---|---|---|
| 3,140,408 | 7/1964 | May | 307—229 |
| 3,193,672 | 7/1965 | Azgapetian | 235—195 X |
| 3,202,808 | 8/1965 | Meixell | 235—194 |
| 3,215,824 | 11/1965 | Alexander et al. | 235—195 X |

MALCOLM A. MORRISON, Primary Examiner

J. F. RUGGIERO, Assistant Examiner

U.S. Cl. X.R.

235—179, 194